United States Patent Office 3,442,277
Patented May 6, 1969

3,442,277
SPEED CONTROL SYSTEM
Bernard B. Barnes, Rockford, Ill., assignor to Woodward Governor Company, Rockford, Ill., a corporation of Illinois
Filed July 15, 1966, Ser. No. 565,619
Int. Cl. F01b 25/06; F02d 31/00; G05d 13/30
U.S. Cl. 137—36                                      4 Claims

ABSTRACT OF THE DISCLOSURE

A speed control system wherein a high gain amplifier responds to the difference or error between (a) a desired or set point speed signal and (b) an actual speed signal to supply its output signal to a proportional actuator constructed and arranged to move the throttle or energy input controlling member of the prime mover to a position which is proportional to the amplifier output signal. The error is in this way restored substantially but not precisely to zero whenever the set point or the loading of the prime mover is changed, and the actual speed is returned to and maintained substantially but not precisely at the set point. To avoid over-correction and hunting, the amplifier is provided with a time integrating circuit (preferably a differentiator connected in a negative feedback path) and to provide an initial, quick response despits the integrator, the amplifier is provided with a time differentiating circuit (preferably an integrator connected in a negative feedback path) having a shorter time constant.

---

The present invention relates in general to apparatus for controlling the speed of prime movers and more specifically to an apparatus wherein speed control is electronically accomplished.

The general aim of the invention is to create a small, rugged, low cost speed control which may be readily adjusted in the field to control prime movers of differing characteristics, yet in each instance combining negligible speed error with excellent stability.

A related object is to provide a highly accurate speed control system wherein the effect upon system accuracy of wear in mechanical components of the final electromechanical transducer is reduced to a negligble amount. More specifiically, it is an important object of the invention to provide a quickly responding, closely tracking, yet highly stable speed control system employing a proportional actuator which can be more inexpensively manufactured than an integrating actuator, the system being much more immune from errors and instabiliity due to changes in temperature and wear of actuator parts compared to systems which utilize integrating actuators.

Another object of the invention is to provide a speed control system having an integrating response but employing a proportional actuator.

Other objects and advantages will become apparent as the following description proceeds, taken in conjunction with the accompanying drawings in which.

While the invention has been shown and will be described in some detail with reference to preferred embodiments thereof, there is no intention that it thus be limited to such detail. On the contrary, it is intended here to cover all modifications, alternatives, and equivalents falling within the spirit and scope of the invention as defined by the appended claims.

*General description of the system and of its operation under steady state conditions*

Figure 1:
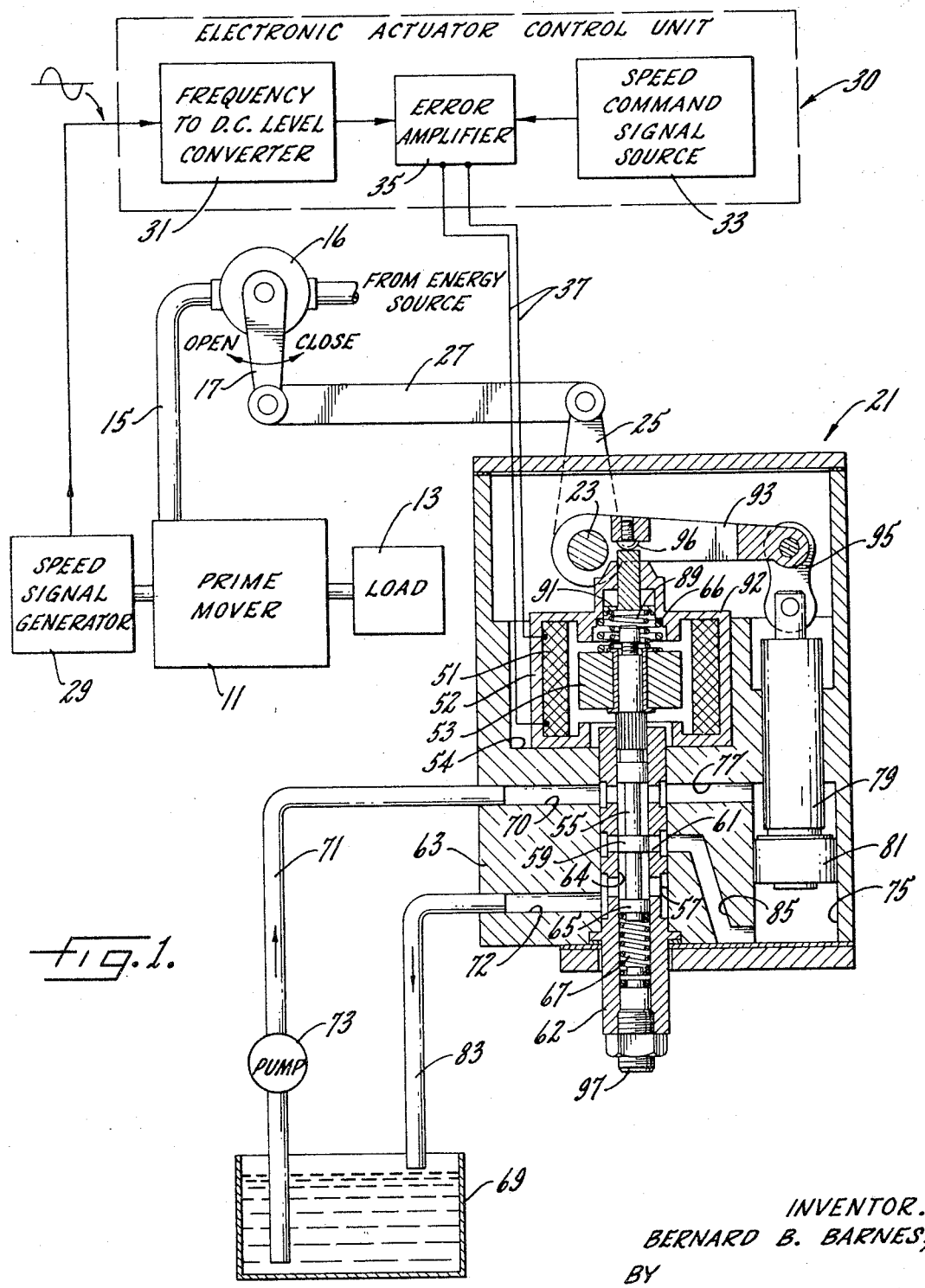
FIGURE 1 is a simplified block diagram of a system embodying the invention, with a hydraulic actuator being shown diagrammatically in cross section.

In order to simplify description of a system incorporating the invention, its operation under steady state conditions will be discussed first, with reference to the block diagram of FIG. 1 and the graphs of FIG. 2. As shown in FIG. 1, the system controls the speed of prime mover 11 driving a load 13. The prime mover 11 is supplied with an energy medium from an energy source through a conduit 15, with the rate of supply being regulated by means such as a throttle valve 16 adjusted by a movable control member 17. The prime mover 11 may, for example, be an internal combustion engine fueled by gasoline, in which case the conduit will be the gasoline supply line with the control member 17 serving as a throttle, and in the detailed description which follows it will be so assumed. Alternatively, however, the prime mover 11 may also take the form of a hydraulic turbine whose load is an electric generator, in which event the conduit 15 will carry pressure fluid from a hydraulic pressure head such as the pen stock of a power dam and the movable control member 17 will control a gate valve in the conduit.

A basic objective of the system is to maintain the speed of the prime mover 11 at a desired, but adjustable value regardless of variations in the load 13 and the torque it imposes on the prime mover. Where the load is an electric generator, such variation may be due to a sudden change in the amount of current drawn from the generator which will correspondingly change the torque required to continue driving the generator at the desired speed. Alternatively, where the prime mover is an engine for driving a vehicle, a change in the size of load 13 may be due to a sudden change in the slope of the terrain over which the vehicle is driven.

Not only should the control system maintain the speed of the prime mover 11 substantially constant regardless of variations in the size of the load 13, but, in most cases, the system should also be capable of changing the speed of the prime mover 11 over a considerable range for a given load. As load size varies, or as required speed is changed, the power output of the prime mover must be adjusted accordingly. This is the function of the control member 17 which is connected to some suitable means, such as the valve 16 for regulating the flow of the energy medium through the conduit in response to the position of the control member 17. Specifically, as the control member 17 is moved through its range of travel, the rate of flow of the energy medium to the prime mover 11 and the power output of the prime mover change correspondingly.

Movement of the control member 17 through its range of positions is accomplished by means of an electrically operated actuator 21 having an output member 23 connected to the control member 17 through links 25 and 27. The operation of the actuator shown in FIG. 1 will be described in detail hereinafter. At this point it need only be noted that the actuator positions its output member 23 and thus the throttle control member 17 in proportion to the value of the electrical signal received. The movement of the output member to different positions may be either linear, or rotational as shown, or along any desired curved path. This type of actuator is known to those skilled in the art as a proportional actuator and the use of that type of actuator in the system of FIG. 1 constitutes an important aspect of the invention.

With the output of the actuator 21 linked to the control member 17 shown, the rate of energy medium flow through the conduit 15 to the prime mover 11 will be varied from a minimum value to a maximum value in accordance with the change in the value of the electrical signal fed to the actuator 21. Means are therefore provided for developing an electrical signal whose value represents the required speed of the prime mover and for developing another signal whose value represents the actual speed of the prime mover. In response to these two signals, an output signal is developed whose steady state value is proportional to the error, i.e., difference in the values of the actual and required speed signals, and this output is applied to the actuator 21.

The actual speed of the prime mover 11 is monitored by means of a speed signal generator 29, which may, for example, be a tachometer alternator whose output is a sinusoidal signal having a frequency which is proportional to the speed detected by the tachometer. Often such tachometers are supplied with the prime mover 11 and for that reason the speed signal generator 29 is shown to be physically associated with the prime mover.

The output of the speed signal generator 29 is converted to a DC signal level, which in magnitude is proportional to the frequency of the speed signal generator output, by means of a frequency-to-DC voltage converter 31 whose output therefor is a direct voltage proportional to the actual speed of the prime mover 11. A speed command signal source 33 produces a second DC signal whose level or value is adjustable to represent the desired or "set point" speed for the prime, mover. In general, the command or set point signal is a DC voltage proportional in magnitude to the desired speed of the prime mover.

The outputs of the frequency-to-DC voltage converter 31 and the speed command signal source 33 are fed to an error amplifier 35 whose output under steady state conditions is proportional to the difference between the values of the two DC signals fed to it. This output is fed to the actuator 21 through lines 37. Because the electric components 31, 33, and 35 are most conveniently mounted together, they are shown as parts of an electronic actuator control unit 30 and will be described in more detail hereinafter.

Figure 2:
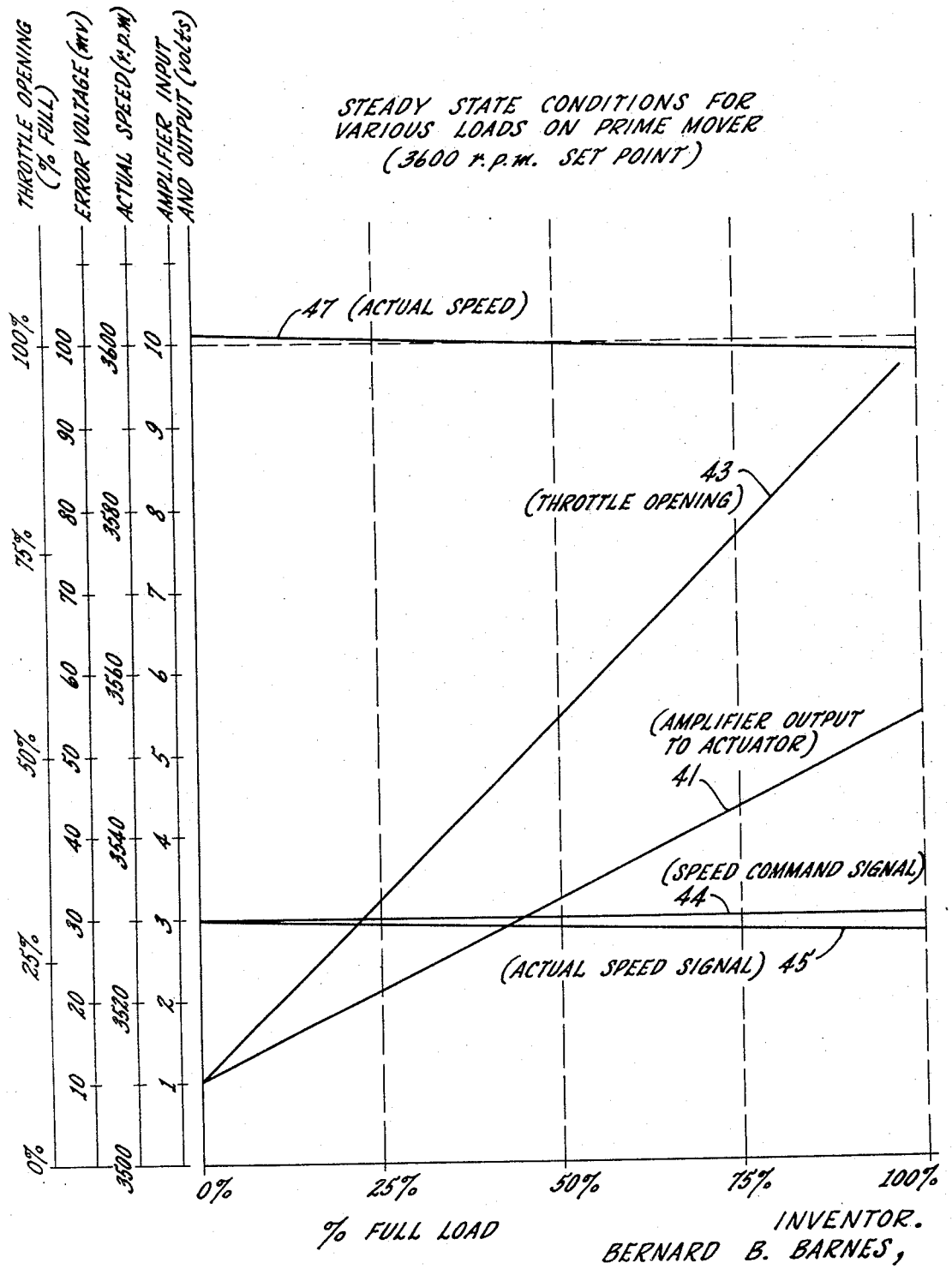
FIG. 2 is a graph showing several system variables at differing loads under steady state conditions.

Operation of the system of FIG. 1 under steady state conditions will be best understood by reference to FIG. 2 which shows the variations in several system parameters as loads on the prime mover tape on different values, i.e., different percentages of "full load" here assumed by way of a specific example to be a throttle controlled gasoline powered engine. The graphs of FIG. 2 illustrate steady state conditions, and with the assumption that the "set point" speed command signal source has been set for 3600 r.p.m. It should also be noted that the specific values as shown for the various voltages at different loads on the prime mover are exemplary and represent typical voltages produced by a particular commercial version of the electronic actuator control unit 30.

As shown in FIG. 2, the output of amplifier 35, represented by the straight line 41, increases from a minimum of about one volt at no load to approximately five and a half volts at full load. The range of voltages produced by the error amplifier 35 is chosen to accommodate the actuator 21 which in the exemplary embodiment requires an input signal of five and a half volts to cause full travel of the output shaft 23 thereof. The line 41 will be linear only if there is a linear relationship between the input signal to the actuator 21 and the power produced by the prime mover 11 in response thereto. It will be realized of course that this relationship need not be linear and that it is sufficient for proper operation of the system if the prime mover 11 is caused to operate at a particular power output for each value of the signal produced by the error amplifier 35.

Throttle opening is represented by the straight line 43 which varies from ten percent of full throttle to one hundred percent of full throttle as the load changes from no-load to full load. This again assumes a linear relationship between the magnitude of the input signal to the actuator and the amount of motion transmitted by its output member 23 to the throttle. Again, this relationship need not be linear and may in fact be purposely made to be non-linear to compensate for a non-linear relationship between the power output of the prime mover 11 and the rate of supply of energy medium thereto.

The speed command or "set point" signal represented by the horizontal line 44 is shown by way of example to have a value of three volts which, being set for a given speed, remain unchanged throughout the load range indicated. In contrast, the line 45, representing the actual speed signal, is shown to have a slightly negative slope, dropping from three volts at no load to its lowest value at full load. This drop in the actual speed signal represents a very small drop in actual speed as load is increased, and is necessary in a system employing a proportional actuator to produce a signal at the input of the actuator load which increases with increasing loads.

Considering steady state conditions only, as load is increased the prime mover 11 must operate at a correspondingly higher power level and hence, as load is increased, the signal applied to the actuator 21 must also be increased to open the throttle wider. It will be recalled that the output produced by the error amplifier 35 is proportional to the difference between the values of the actual speed signal and the speed command signal. When it is also considered that neither the speed command signal nor the gain of the error amplifier 35 change with the load on the prime mover 11, it will be seen that in order for the output of the error amplifier 35 to rise as the load is increased, the actual speed signal must correspondingly drop. Actual speed and its droop with increasing load is shown in FIG. 2 by line 47 whose slope is greatly exaggerated to permit the speed droop to be seen. As will be explained in greater detail hereinafter, it is an important aspect of the invention that the amount of speed drop required to cause the output of the error amplifier to go through its full range is reduced to a very small percentage of the set point speed by the use of a very high gain operational amplifier, but without at the same time destroying the stability of the speed control system.

*The proportional actuator and its advantages over integrating actuators in speed control systems*

With the foregoing general organization of the speed control system in mind, the proportional actuator illustrated in the exemplary embodiment of FIG. 1 may be described in more detail. As noted above, a hydraulic actuator has been illustrated in FIG. 1 for purpose of illustration only and other types of actuators, not operating on hydraulic principles, may be equally well employed.

To convert the electrical output of the error amplifier 35 into a corresponding displacement of the output member 23, the output leads 37 of the error amplifier are connected to a solenoid winding 51 housed within a ferromagnetic casing 52 disposed in a recess 54 at the top of the actuator casing 63. Disposed centrally within the winding 51 is a vertically movable armature 53 made of ferromagnetic material and permanently magnetized so that its opposite ends constitute opposite magnetic poles. As a result, flow of current from the amplifier through the winding 51 exerts an axial force upon the armature 53. The magnetic poles in this instance are so oriented relative to the direction of current flow in the winding 51 that the force is directed downwardly.

Disposed below the armature 53 in the actuator casing 63 is a cylindrical passage 57 communicating with several other passages in the casing. Fixed within the passage 57 is a pilot valve bushing 62 having an axial bore 64 communicating through radial ports with the several passages in the actuator casing 63.

Depending from the armature 53 is a plunger 55 carrying a pilot valve land 59 which normally covers a port 61 in the pilot valve bushing 62. Near its bottom end the plunger 55 carries a disc 65 bearing on a lower compression spring 67 which, together with an upper compression spring 66, serves to center the pilot valve land 59 on the port 61. Pressure fluid is supplied to the axial bore 64 above the pilot land 59 from a reservoir 69 through a supply line 71 and passage 70 by means of a pump 73.

Through a passage 77 the supply line 71 also communicates with the upper end of a cylinder 75 defined by the casing 63 and containing a rod 79 with a piston 81 at its bottom end. A return path for the fluid is provided by a passage 72 communicating with the bore 64 at a point beneath the pilot land 59 and leading through a conduit 83 back to the reservoir 69. An additional fluid flow path is provided between the port 61 in the bushing 62 and the lower end of the cylinder 75 by a passage 85, such path being closed when the pilot valve land 59 is centered.

Supported by the armature 53 and disposed within the upper centering spring 66 is a rebalancing compression spring 89 which bears at its upper end against a spring seat 91 having an upwardly extending stem slidably mounted in a bore within the cover 92 of the ferromagnetic casing 52. Positioned above the spring seat 91 and connected at one of its ends to the output shaft 23 is a connecting lever 93. The opposite end of the lever 93 is connected to the top of the rod 79 through a connecting link 95. By means of a depending round headed bolt 96 mounted intermediate its ends, the lever 93 bears on the stem of the spring seat 91 so that downward travel of the rod 79 increases the compression of the spring 89.

Means in the form of an adjusting screw 97 in the bushing 62 and underneath the compression spring 67 are provided for adjusting the upward force exerted by the latter spring against those downward forces exerted by springs 66 and 89 so as to center the pilot valve land 59 on the port 61 in the absence of, or for any desired amount of, current flow through the winding 51.

Let it be assumed that with the adjusting screw 97 positioned to center the valve land 59 in the absence of current through the winding 51, the amount of current through the winding is increased so that an additional downward force is exerted on the armature 53. The plunger 55 will move downwardly and the pilot valve land 59 will uncover its associated port 61 placing the passage 85 in communication with the passage 70, and through it, with the pressure supply line 71. Under these circumstances fluid will flow from the fluid supply line 71 through the passages 70 and 85 into the lower end of the cylinder 75. Although fluid under pressure is also supplied to the upper end of the cylinder 75 through the passage 77, the bottom surface of the piston 81 is greater in area than its effective top surface, causing a net upward force to be exerted on the piston 81 by the pressurized fluid in the cylinder 75, and moving the rod 79 upwardly. Through the connecting link 95, the rising rod 79 rocks the lever 93 counterclockwise, causing the amount of compression to which the spring 89 is subjected to be reduced. As a result, the plunger 55 rises, lifting with it the pilot valve land 59. When the rod 79 has risen far enough to reduce the downward force exerted by the compression spring 89 sufficiently to counteract the additional downward force due to the flow of current through the transducer winding 51, the land 59 will return to its centered position, thereby stopping further movement of the rod.

As the amount of current through the winding 51 is increased, the downward force exerted upon the plunger 55 by the armature 53 is correspondingly increased and therefore the rod 79 and the lever 93 will have to rise through a correspondingly greater distance before they have reduced the force exerted by the spring 89 sufficiently to re-center the land 59 over the port 61. Thus with increasing values of current through the solenoid winding 51 the output shaft 23 will be turned increasingly counterclockwise by the lever 93, until it reaches a rebalanced position at which the land 59 recloses the port 61.

Let it be assumed next that the current through winding 51, maintained at a relatively high value and with the pilot valve 59 centered, is suddenly reduced to a lower value. Such current reduction decreases the downward force electromagnetically exerted on the armature 53, so that the plunger 55 travels upwardly, uncovering the port 61 and placing the passage 85 in communication with the return line 83. This change results in the removal of pressure from the lower end of the cylinder 75. As a result, the piston 81 and its rod 79 are driven downwardly by the pressurized fluid in the upper end of the cylinder 75. Downward movement of the rod 79 rocks the feedback lever 93 clockwise, and increases the compression of the spring 89, causing the downward force exerted by that spring upon the plunger 55 to be increased. When the rod 79 has dropped far enough to increase the force exerted by the spring 89 by an amount equal to the reduction in the force on the armature, the land 59 will return to its centered position over the port 61 stopping further translation of the rod 79.

From the foregoing it will be seen that the angular position of the output member 23 is changed according to changes in current supplied to the solenoid winding 51. In other words, the angular position of the member 23, and thus the degree to which the throttle valve 16 is opened, is substantially proportional to magnitude of current supplied to the solenoid winding 51, although the relationship need not be strictly linear. An understanding of the operation of the proportional actuator described above will aid in appreciating its advantages over integrating actuators in speed control systems.

An integrating actuator may be readily visualized by picturing a proportional actuator of the type described above but with the connection between the rod 79 and the pilot valve plunger 55 removed. In an integrating actuator, therefore, the net downwardly and upwardly acting forces on the plunger 55 are in balance only when a particular amount of current (usually zero) flows through winding 51.

If the amount of current through the winding 51 changes from the amount required to center the pilot valve land 59 over its associated port 61, the land 59 will either rise or drop from its centered position depending upon whether the current is reduced or increased. The extent of the rise or drop of the land 59 is proportional to the change in the winding current and as a result brings about a movement of the piston 81 and its connected rod 79 whose velocity is proportional to the change in the winding current. As a result of the translation of the rod 79, the position of the output member 23 is correspondingly changed, altering the rate at which the energy medium is applied to the prime mover 11 so as to return the speed of the prime mover to the level indicated by the speed command signal source.

At this point the output of the error amplifier 35 is returned to the particular level for which the pilot valve land 59 is centered, usually zero, and the pilot valve land 59 is re-centered over and shuts the port 61. Thus, when an integrating actuator is used to correctively adjust the steady state position of a throttle, it does so by responding to an "error" signal which must return to normal or zero when equilibrium is re-established. Otherwise, the actuator output member and the throttle will continue to move. And to reverse movement of the throttle, the error signal must reverse its sense relative to the normal or zero value. In contrast, in a speed control system using a proportional actuator, the input signal to the actuator need only increase or decrease in order to move the throttle to a position more open or closed so as to hold the set point speed when the load increases or decreases.

The above difference in turn explains why a proportional actuator is not nearly as sensitive to "null point shift" as is an integrating actuator. "Null point shift" refers to a change in the position of the pilot valve land 59 at which it is centered over and shuts its associated port 61. Such a shift can be caused by unequal thermal expansion of metals in the integrator as well as by wear or insufficient precision of its parts. Attempts to reduce null point shift add considerably to the cost of manufacturing integrating actuators which, as a result, are much more expensive than proportional actuators. Null point shift in an integrating actuator causes a change in the amount of current that is required to center or shut the pilot valve. Since the particular amount of current originally required to shut the pilot valve is produced at minimum or zero speed error, if an integrating actuator is properly adjusted, a change in the current required to shut the pilot valve can only be produced by an added, finite and constant speed error in the system.

On the other hand, the amount of current required to shut the pilot valve of a proportional actuator is not at all critical. Indeed, it changes widely with load. Thus the effect of null point shift on a system using a proportional actuator is the same as a slight increase in the load on the prime mover 11. Both of these change the current required to shut the pilot valve and both are "seen" by the rest of the speed control system as the same phenomenon: a need for a change in the solenoid winding current required to shut the pilot valve. And just as the system employing a proportional actuator is able to provide the varying amounts of solenoid current necessary to shut the pilot valve at various loads, with only a slight change in the difference between the resulting actual speed and the required speed, so it is able to supply whatever change might be brought about in the required amount of "valve shutting" current by null point shift.

The electronic actuator control unit

Figure 3:
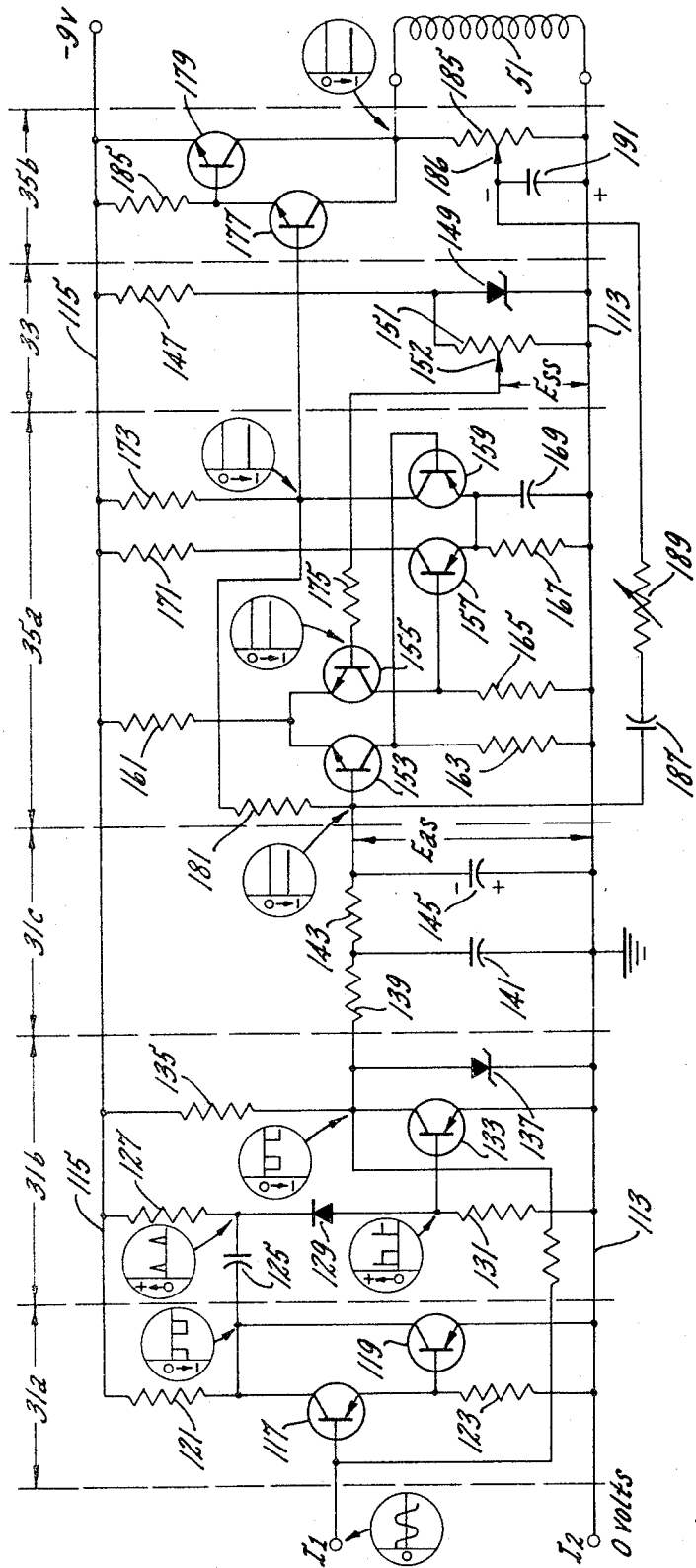
FIG. 3 is a detailed schematic diagram of an exemplary electronic control unit embodying features of the invention.

The control unit 30 shown in block form in FIG. 1 appears in schematic form in FIG. 3. It is this unit which, in combination with the proportional actuator 21, makes the speed control system both accurate and stable. Stages 31a to 31c of the schematic diagram illustrate an exemplary circuit for the frequency-to-DC voltage converter 31 of the control unit 30. Section 33 of the schematic diagram represents a preferred circuit for the speed command signal source 33 of FIG. 1. Finally, sections 35a and 35b represent a preferred version of the error amplifier shown as block 35 in FIG. 1.

All stages of the exemplary unit of FIG. 3 receive operating voltage and current from a common power supply here illustrated as a reference voltage supply line 113 and a negative voltage supply line 115. In a commercial embodiment of the cicuit, the line 113 is at zero volts, or "ground" level, while the negative line 115 is held at −9 volts, and the circuit operation will be explained with these assumed voltage levels.

The frequency modulated, alternating output voltage of the speed signal generator 29, usually an electric tachometer, is applied to input terminals I1, I2 and thus to the base of a transistor 117 (FIG. 3) forming the input of an impedance matching and clipping circuit 31a. An additional stage of amplification is provided by a transistor 119 whose collector is connected to the collector of transistor 117 and, through resistor 121, to the −9 volt supply line 115, and whose base is connected to the emitter of transistor 117 and, through resistor 123, to the ground line 113. The emitter of transistor 119 is also connected to ground.

During positive half cycles of the alternating input voltage applied to the terminals I1, I2, both transistors 117 and 119 are cut off and their collectors rest at about −9 volts. During negative half cycles of the input voltage, the transistors 117 and 119 conduct and their collectors rise to nearly zero volts due to the very low emitter-to-collector impedance presented by the transistor 119 in its saturated condition. As a result, the output of the impedance matching and clipping circuit 31a, appearing at the collectors of transistor 117 and 119, is a square wave train alternating in value between approximately zero volts and −9 volts, and having a frequency equal to that of the AC speed representing signal. This voltage is applied to the left terminal of capacitor 125 whose other terminal is connected through a resistor 127 to the line 115 to form a differentiating circuit at the input of a pulse standardizer 31b.

As is well known, a differentiating circuit converts a square wave train to a series of alternate oppositely polarized voltage spikes. To eliminate negative-going voltage spikes, the junction of capacitor 125 and the resistor 127 is connected to the cathode of a diode 129 whose anode is connected through a resistor 131 to ground. The anode of diode 129 is also connected to the base of a transistor 133 having its emitter connected to ground and its collector connected through a resistor 135 to the negative supply line 115.

Transistor 133 is normally biased into saturation by the voltage divider formed of the resistor 127, diode 129, and resistor 131 which applies a slightly negative voltage to the base of the transistor 133. While the transistor 133 is saturated, its collector is held at a slightly negative voltage determined by its saturation resistance.

During each negative half cycle of the sinusoidal input signal applied to the input terminals I1, I2, the transistors 117 and 119 become saturated and the collectors rise from about −9 volts to approximately zero volts, pulling the left terminal of capacitor 125 through the same voltage change. As a result, the right terminal of the capacitor 125 is raised by a corresponding amount from a normally negative voltage to a substantial positive voltage. The capacitor 125 is quickly charged through resistor 127 and its right terminal is rapidly returned to its normally negative voltage level. But, while the right terminal of the capacitor 125 is temporarily positive, conduction through the diode 129 is cut off and its anode rises to zero voltage level thus cutting off the transistor 133. As a result, during each positive voltage spike appearing at the junction point of the capacitor 125 and the resistor 127, the transistor 133 is cut off, its collector drops from the normal voltage near zero to a negative voltage level whose peak value is determined by a Zener diode 137 connected across the collector and emitter of the transistor 133.

From the foregoing, it will be seen that the pulse standardizer 31b produces a series of negative-going voltage pulses at the collector of transistor 133 which forms the output terminal of the pulse standardizer, that each pulse is of a standard height determined by the Zener diode 137, and that the pulses are of a standard duration determined by the time constant of the differentiating circuit 125, 127.

The output of the pulse standardizer 31b is applied to the input of the two-stage filter 31c whose first stage comprises a resistor 139 and a capacitor 141 connected in series across the output of the pulse standardizer 31b, and whose second stage includes a second resistor 143 and a second capacitor 145 connected in series across the first capacitor 141. The filter 31c operates as an integrator and produces at its output a negative voltage level whose magnitude is proportional to the time integral of the voltage pulses appearing at the output of the pulse standardizer 31b.

It will thus be apparent from the above description that the clipping circuit 31a, the pulse standardizer 31b, and the filter-integrator 31c comprise in combination a means for producing a DC signal whose value is proportional to the frequency of the AC signal produced by the speed signal generator 29 and that these three circuits, in combination with the speed signal generator 29, serve to produce a DC signal E$as$ across capacitor 145 whose value is representative of the actual speed of the prime mover 11.

It will be recognized by those skilled in the art that the circuits 31a, 31b, and 31c represent only one of many possible arrangements for converting the AC signal produced by the signal generator 29 into a DC signal level and that any of these circuits may be replaced by others serving to perform an equivalent function. Indeed, a speed signal generator may become available which will produce the desired DC signal directly, without the need for any additional signal-converting circuitry. Such a signal generator could be used with equal effectiveness in a speed control system embodying the invention.

To produce an adjustable speed command signal whose value is representative of the required speed for the prime mover, a speed command signal source 33 is provided. It includes a supply resistor 147 and a Zener diode 149 connected in series across the voltage supply lines 113 and 115, with a potentiometer 151 being connected across the Zener diode 149. The rating of the Zener diode 149 is selected to produce, at the wiper 152 of the potentiometer 151 a total voltage range which is sufficient to match the output of the frequency-to-DC level converter 31 from minimum actual speed to maximum actual speed. In one commercial embodiment of the circuit of FIG. 3 this voltage is —6.6 volts, so that the "set point" voltage E$ss$ at the wiper 152 may be adjusted to any value between 0 volts and —6.6 volts.

In carrying out the invention, the electronic actuator control unit also includes means for producing, in response to the outputs of the frequency-to-DC level converter 31 and the speed command signal source 33, a steady state control signal whose magnitude is a function of the amount by which the required speed of the prime mover 11 exceeds its actual speed. In the preferred embodiment shown in FIG. 3, where actual speed is represented by a first negative DC signal E$as$ produced by the circuit 31, and desired speed is represented by a second negative DC signal E$ss$ produced by the circuit 33, the means for producing a control signal is an amplifier whose output is proportional to the difference in the values of such DC signals. The choice of negative polarity for these signals is arbitrary and a system wherein both the speed control signal and the actual speed signal are positive would be equally effective. It is an important feature of the invention, however, that the amplifier has very high gain so that the control signal produced thereby is many times greater than the difference in the values of the DC signals to which it responds.

A preferred form of such a high gain amplifier is shown in FIG. 3 and includes a differential amplifier stage 35a and a voltage inverter-buffer stage 35b.

To achieve its high gain, the differential amplifier stage 35a itself consists of two cascaded stages, the first stage including NPN transistors 153 and 155 and the second stage including PNP transistors 157 and 159. The emitters of the first stage transistors 153 and 155 are connected through a common emitter resistor 161 to the negative supply line 115 while their collectors are connected to the ground line 113 through load resistors 163 nad 165 respectively. The second stage transistors 157 and 159 are similarly connected, but because they are of the PNP type, they are connected in a direction opposite to that of the first stage, NPN transistors 153 and 155. Thus, the emitters of transistors 157 and 159 are connected to the ground line 113 through a common emitter resistor 167 shunted by a filter capacitor 169, and their collectors are connected to the negative supply line 115 through load resistors 171 and 173 respectively.

One input to the differential amplifier 35a is the actual speed signal E$as$ which is applied to the base of transistor 153 through a connection from the output of the filter-integrating circuit 31c. The other input to the differential amplifier 35a is the output voltage E$ss$ of the speed command signal generator 33, applied through a resistor 175 connected between the wiper 152 of the potentiometer 151 and the base of the transistor 155.

So long as these voltages E$as$ and E$ss$ are equal, transistors 153 and 155 remain cut off and their collectors remain at substantially zero volts potential. As a result, both of the second stage transistors 157 and 159, whose bases are connected to the collectors of the first stage transistors 155 and 153 respectively, also remain non-conducting so that the collector of the transistor 159, which serves as the output terminal of the differential amplifier stage 35a, remains near —9 volts.

On the other hand, if the voltages at the bases of the first stage transistors 153 and 155 differ, these transistors become unbalanced and conduct unequal amounts of current, with the transistor whose base is less negative drawing the heavier current through its collector resistor. This unbalance is further amplified by the second stage transistors 157 and 159 with the collector of transistor 159 rising above —9 volts by an amount which, within the limits of the amplifier, is proportional to the difference in the values of the voltages that are applied to the bases of the transistors 153 and 155. For added gain, a positive feedback loop is provided from the collector of the transistor 159 through a feedback resistor 181 to the base of transistor 153.

To provide the relatively heavy current required by winding 51, the output of the differential amplifier 35a is current-amplified by a buffer-inverter stage 35b. In addition to providing current amplification, the buffer-inverter stage 35b also serves to invert the output of the differential amplifier 35a so as to provide a signal which is 180° out of phase with the input to transistor 153. The reason for the need for such a signal will become apparent as this description proceeds.

The buffer-inverter 35b may be any one of several types well known to those skilled in the art. In the exemplary circuit of FIG. 3, two transistors 177 and 179, connected as a Darlington pair, are employed. The base of the transistor 177 is the input to the buffer-inverter circuit and is connected to the collector of the second stage transistor 159 of the differential amplifier 35a. The emitter of transistor 177 is connected to the base of transistor 179 and through a resistor 185 to the —9 volt supply line 115 to which the emitter of the transistor 179 is also connected. The collectors of the transistors 177 and 179 are connected to the other supply line 113 through a potentiometer 185 whose fixed terminals serve as the output terminals of the entire electronic control unit 30 and to which the solenoid winding 51 is connected.

So long as the differential amplifier 35a is balanced, the base of transistor 177 will remain at about —9 volts, so that neither transistor 177 nor its mate 179 will conduct to any substantial extent. If the differential amplifier 35a becomes unbalanced so that the collector of transistor 159 rises above —9 volts, both transistors 177 and 179 will be biased to conduction, drawing current through the potentiometer 185, and through the solenoid winding 51 in parallel with the potentiometer.

From the foregoing description of the differential amplifier 35a and of the buffer-inverter circuit 35b, it will be seen that if the actual and desired speeds for the prime mover 11 are exactly equal so that the actual and speed command signals applied to the bases of the transistors 153 and 155 are the same, the differential amplifier will apply a disabling signal level to the transistor 177 and through that transistor to its mate 179, so that no current will flow through the solenoid winding 51. Under these conditions therefore the output member 23 of the proportional actuator will be at its normal position, e.g., with the engine throttle fully closed or partly open, depending upon initial settings for the centering springs.

Let it be assumed next that the actual speed signal E$as$ at the base of transistor 153 becomes less than the speed command signal Ess at the base of transistor 155. This may result either from an increase in the load upon the prime mover 11 or from an increase in the value of the speed command signal, indicating that the wiper of the potentiometer 151 has been turned due to increase in the required speed for the prime mover. The resulting unbalance causes a rise in the collector voltage of the transistor 159 due to the flow of current through its load resistor 173. This in turn biases the transistors 177 and 179 into conduction to an extent which is proportional to the rise in the voltage level of the collector of the transistor 159. This current, which flows through the solenoid winding 51 of the proportional actuator 21, will cause its output shaft 23 to turn counterclockwise by an amount which is proportional to the difference in the values of the voltages at the bases of the transistors 153 and 155.

On the other hand, if due to a reduction in load or in the desired speed for the prime mover 11, the voltage Eas at the base of transistor 153 is more negative than the set point voltage Ess applied to the base of transistor 155, the latter will begin to conduct but the transistor 153 will remain cut off and will also maintain the transistor 159 in non-conduction. Consequently, so long as actual speed exceeds desired speed, the buffer-inverter stage 35b will be maintained non-conducting and will not send current through the solenoid winding 51, thus causing the output member 23 of the proportional actuator to remain in its rest position. This position of the actuator is associated with minimum throttle opening and tends to cause the speed of the prime mover 11 to drop until the signals at the bases of the transistors 153 and 155 again become nearly equal.

The voltage gain of the differential amplifier 35a is very high, usually over 5000. It was explained earlier, in connection with the curves of FIG. 2, that as the amount of required throttle opening is increased due to an increase in the load on the prime mover 11, the current through the solenoid winding 51 will have to increase proportionately from a minimum amount at minimum required throttle opening to a maximum amount at the largest amount of required throttle opening. It was also stated that the varying amounts of current produced by the error amplifier 35 are a function of the difference in the values of the actual speed signal and the speed-command signal and that, for a given required speed, as load increases, the gradually increasing difference in the values of the actual speed and speed command signals that is necessary to produce the correspondingly increasing current through the solenoid winding 51 will have to be brought about by a gradual drop in the value of the actual speed signal.

Due to the very high gain of the differential amplifier 35a, the actual amount of difference in the values of the actual speed signal and the speed command signal to produce the largest required current through the solenoid winding 51 will be quite small and therefore the amount by which the actual speed signal needs to drop from no load to full load is kept to a minimum. Since the drop in the value of the actual speed signal represents a drop in the speed of the prime mover, this minimization in the amount by which the speed signal needs to drop from no load condition to full load condition to accommodate the total range of current required by the proportional actuator results in a very small speed regulation of the prime mover 11 from no load to full load condition. Indeed, the steady state speed regulation with changes in load is on the order of one-tenth of one percent by virtue of the high gain of the amplifier.

*Dynamic system response characteristics*

In the foregoing there has been described a high gain amplifier which reduces steady state error present in a speed control system employing a proportional actuator to a very small amount. In accordance with the invention, the very high gain and hence low steady state error is obtained without sacrificing system stability by the provision of means whereby an integrating response is imparted to the high gain electronic amplifier 35. By virtue of its integrating response the output of the amplifier 35 is made to be proportional to the time integral of the difference between the values of the actual speed signal and the speed command signal.

Considered in terms of amplifier behavior following sudden changes in speed error, the integrating response of the amplifier produces a gradually changing overall gain which may be adjusted to increase from a minimum value, when the difference between the actual speed and speed command signals is maximum, to a maximum value when the difference between those signals is at a minimum.

In accordance with a further and optional feature of the invention, means are also provided to delay the time at which the integrating response is imparted to the amplifier so as to allow the amplifier to operate at its full gain immediately after a change in error, thereby to increase the speed of response of the system to such changes.

For the purpose of imparting an integrating response to the amplifier 35 shown in FIG. 3, a negative feedback loop including a differentiating network is provided between the output of the buffer-inverter stage 35b and the base of transistor 153 of the differential amplifier 35a. As here shown, a capacitor 187 and a variable resistor or rheostat 189 are connected in series between wiper 186 of the potentiometer 185 and the base of transistor 153 to form a simple differentiating network. It may be shown mathematically, and it is known to those skilled in the art, that the presence of a differentiating network in the negative feedback loop of an amplifier imparts an integrating response characteristic to the amplifier and that, conversely, the presence of an integrating network in the negative feedback loop of an amplifier imparts a differentiating response thereto. It will be understood that such a manner of imparting a desired response to the amplifier represents only one of several possible means of accomplishing the desired result and that other alternatives will present themselves to those skilled in the art. For example, an integrating response may also be imparted to the amplifier 35 by connecting an integrating network between the collector of transistor 159, representing the output terminal of the differential amplifier 35a, and the base of transistor 177, representing the input of the buffer-inverter stage 35b.

As an additional and optional feature of the invention, the effect of the differentiating network 187, 189 is delayed by a predetermined amount by a capacitor 191 connected between the wiper 186 and the zero voltage supply line 113. This capacitor, in combination with the portion of the potentiometer 185 which is between its wiper 186 and the collector of transistor 179, forms an integrating network whose effect, in accordance with the explanation given above, is to impart a differentiating response to the amplifier 35.

The effect of the integrating response of the amplifier upon system performance is best seen by describing the reaction of the system to a change in error between actual and required speeds for the prime mover 11.

Assume that, due to a sudden increase in load upon the prime mover 11, its speed drops abruptly. Since the speed signal appearing at the base of transistor 153 of the differential amplifier 35a has a negative level which becomes more negative with increasing speed, a drop in speed will result in the speed signal and the base of transistor 153 becoming more positive. This increases the unbalance existing in both stages of the differential amplifier 35a and causes an increase in the amount of current drawn by transistor 159 through its load resistor 173. The increased current raises the voltage at the base of transistor 177 of the buffer-inverter stage 35b, causing it, and its associated transistor 179, to conduct more current through the solenoid winding 51, thereby to open the throttle and raise the prime mover speed back to the set point value. Due to the high gain of the amplifier, the response would, if not otherwise controlled, cause the actuator to move the engine throttle to a wide open position, and the prime mover would overspeed and perhaps hunt.

However, the increase in solenoid current is accomplished by an increase in the voltage across the feedback potentiometer 185 and the wiper 186 becomes more negative in potential. This drop in the voltage at wiper 186 is initially transferred through the resistor 189 and capacitor 187 to the base of transistor 153, because the potential across the capacitor cannot quickly change. The output voltage drop thus tends to counteract the voltage rise imposed on the base of the transistor 153 by the actual speed signal, and will thus be recognized as a negative feedback signal which tends to reduce the overall, instantaneous gain of the amplifier 35. The amount of negative feedback is highest when the voltage drop at the potentiometer wiper 186 is first applied to the capacitor 187 since substantially the entire drop is transferred through the capacitor to the base of transistor 153. As a result, during the period when the difference between the actual speed signal at the base of transistor 153 and the speed command signal at the base of transistor 155 is large, the total gain of the amplifier is temporarily reduced, thus tempering its response and the response of the entire speed control system, so as to eliminate an over-corrective reaction which might result in hunting and possibly even in total instability.

Even with the reduced gain, the amplifier response is sufficient to increase the current in the winding of the solenoid 51 enough to cause the actuator to increase the rate at which energy medium is applied to the prime mover 11 sufficiently to reduce the amount of error between actual and desired speed, or, in other words, to bring back the speed of the prime mover to its level before load on it was increased. As this corrective action takes place and the speed of the prime mover 11 is increased, the capacitor 187 charges, raising the voltage level at its left plate, connected to the base of transistor 153. The amount of negative feedback applied to the differential amplifier 35a is thus reduced and its instantaneous gain is increased until finally the capacitor 187 is fully charged.

In accordance with the invention, the rate at which the capacitor 187 is charged, and therefore the rate at which negative feedback is reduced and amplifier gain is returned to its maximum, may be tailored to the response characteristics of the prime mover whose speed is being controlled—and in such a manner that amplifier gain is returned to its maximum value at about the time when speed error has been reduced to its steady state for the new load-speed requirements. It is only necessary to adjust the rheostat 189 so as to change the time constant of the differentiating circuit 187, 189 and thereby vary the time and rate of charging of the capacitor 187. The duration of the depression of amplifier gain after a step change in the actual speed signal $E_{as}$ may thus be increased or decreased to suit the time lags of any particular prime mover being controlled. In this way, the instantaneous amplifier gain is made a minimum when error is maximum, and is returned gradually to its maximum value as the system error, that is the error between actual and desired speed, is smoothly restored to a near zero equilibrium value. As a result, the system is made stable under transient conditions. Yet, because the amount of speed error under steady state conditions is inversely proportional to steady state amplifier gain, and the latter is extremely high, steady state error is also reduced to a minimum.

In the above description, the effect of the integrating network, including a portion of the output potentiometer 185 and the capacitor 191, was ignored. As indicated, the purpose of the integrating network is to delay the effect of the differentiating network 187, 189.

Under some circumstances, especially where the speed of the prime mover 11 continues to drop even after corrective action of the speed control system has begun, it is desirable not to reduce the gain of the amplifier 185 for some time, usually until the error has reached its maximum value. It is for this purpose that the capacitor 191 is provided. By delaying the reduction in the gain of the amplifier 35, the corrective action of the error amplifier 35 in combination with the proportional actuator 21 is maximized during the period when the error is still increasing and so while the risk of causing undesirable oscillations due to over-correction does not yet exist.

Thus, still considering circuit operation resulting from a sudden drop of speed, the resulting drop in the voltage level at the top terminal of the potentiometer 185 is not immediately manifested at the wiper 186 of the potentiometer. Instead, the voltage level of the wiper 186 drops gradually as the capacitor 191 becomes charged and thus the full negative feedback signal is applied to the differentiating network 187, 189 only after some delay so that amplifier gain is high at first and is only gradually reduced. Preferably, the rate at which the capacitor 191 is charged is selected so that the amplifier gain drops to a minimum when the speed error has reached its maximum value. It is at this point, when the capacitor 191 has become substantially fully charged, that the differentiating circuit 187, 189 becomes fully effective.

Operation of the system under transient conditions as explained above is best illustrated in FIG. 4 which shows the response of the system to a sudden increase in the load upon the prime mover 11. This increase is represented by the step which occurs in the line 193 at time $t1$. The increase in load results in a drop in speed shown by the curve 195. Although corrective action of the speed control system begins at this point, speed continues to drop until time $t2$, although at a diminishing rate. Corrective action of the speed control system is brought about by the increase in the speed error represented by the curve 197. Negative feedback, shown by the curve 199 is initially quite small and, as a result, overall amplifier gain, shown as the curve 201, is initially at its high maximum value. Thus, the output of the amplifier 35, represented by the curve 203, is at its highest shortly after the speed drop occurs, even though the actual drop in speed at that time has not reached its greatest value.

The output of the amplifier 35, applied to the proportional actuator 21, causes a very large excursion of its output shaft 23 resulting in a large throttle opening, represented by the curve 205. The amount by which the throttle is opened in response to a step increase in load is usually much greater than that required to maintain the prime mover at the required speed at the new load and as a result tends to increase the speed of the prime mover 11 towards its desired value quite rapidly.

Figure 4:
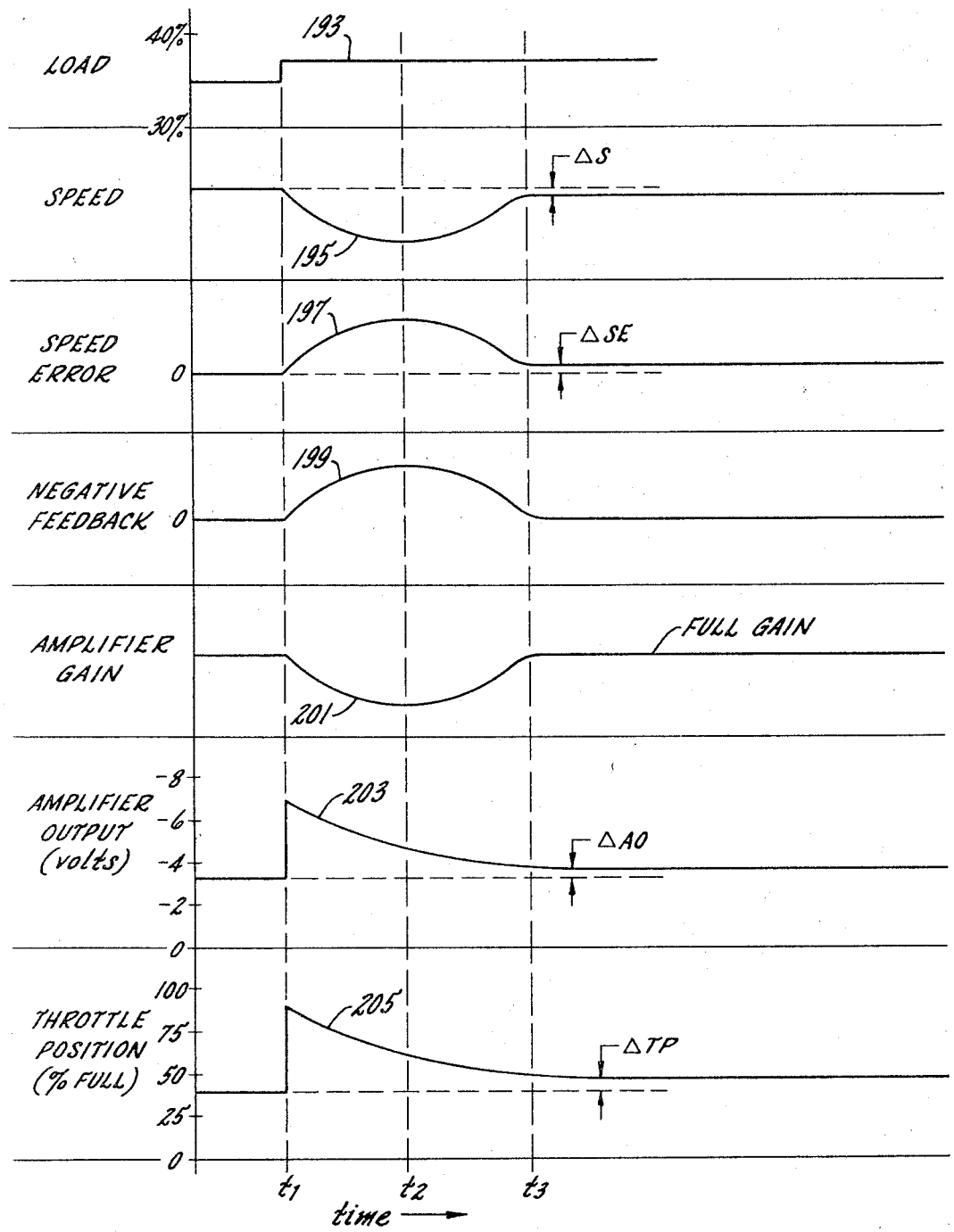
FIG. 4 is a graph illustrating the operation of the system after a sudden increase in load.

Principally due to the effect of the capacitor 191 upon the negative feedback signal 199, the amount of negative feedback does not reach its maximum value until the speed error, curve 197, has stopped increasing, which is shown to occur at time $t2$ in FIG. 4. It is at approximately this time that the effect of the differentiating network 187, 189 becomes important, tending as it does, to reduce the amount of negative feedback 199 and to increase amplifier gain 201. As a result, the gain curve 201 of the amplifier increases from a minimum at time $t2$ to a maximum at time $t3$.

In accordance with the invention the time period $t2$, $t3$ is selected so that the amplifier gain will return to its maximum value at about the same time that the speed of the prime mover reaches its steady state value. In this manner, amplifier gain is highest when speed error is lowest, thus reducing the amount of steady state speed error or speed regulation to a very low level.

It is worth observing in FIG. 4 that after the system has performed its corrective action and has returned to a new steady state condition at time $t3$, the throttle is opened appreciably more than it was at time $t1$ before the increase in the load upon the prime mover 11. This change shown as ΔTP to the new throttle position represents the extent of throttle opening required to maintain prime mover 11 at the set point speed for the new, increased load.

Similarly, the amplifier output, as shown by curve 203, is also left at a higher level at time $t3$ than it was before the increased load, since this increased output is necessary to provide the increased angular displacement of the proportional actuator output shaft 23 required to hold the throttle to its new position. Such change in steady state output from the amplifier is labeled ΔAO.

Finally, it will be noted that speed error curve 197 returns to slightly higher steady state value at time $t3$, compared to its value, the offset being shown to an exaggerated extent as ΔSE, at time $t1$. This, it will be recalled, results because with a given steady state gain factor in the amplifier, the increased amplifier output required by an increased load is brought about by a slightly higher speed error. However, because of the very high steady state gain of the amplifier 35, the actual increase in the speed error required to produce the increased amplifier output is quite small and the actual speed 195 of the prime mover 11, at time $t3$ under the increased load, will be only slightly below (see ΔS in curve 195) its previous level at time $t1$ under the previous, lower load.

It will be apparent from what has been said that the negative feedback connection through the differentiating circuit 187, 189 functions in a similar but opposite sense in response to a momentary overspeed resulting from dropping of load on the prime mover or abruptly decreasing the speed setting. In this latter case, the capacitor 189 is initially charged to a voltage equal to the difference between the potential at the wiper 186 and the base of transistor 153, so there is virtually no negative feedback effect and the amplifier gain is high. When the voltage amplifier output voltage tends suddenly to decrease (wiper 186 becomes less negative), the feedback connection will make the base of transistor 153 less negative—reducing the amplifier gain. The negative feedback effect will be temporary, and will be gradually lessened as the capacitor 187 charges to a voltage equal to the new steady state difference between the potentials at the wiper 186 and the base of transistor 153. In describing operation of the circuit of FIG. 3, means were shown in the form of a differentiating circuit in the negative feedback loop of the amplifier 35 for imparting an integrating response to the amplifier and means were also shown in the form of an integrating circuit in the feedback loop of the amplifier for delaying the integrating effect of the differentiating circuit upon the gain of the amplifier. For clarity of description and ease of understanding, each circuit was described independently of the other and in such a manner as to ignore any overlap in the times of their operation. Actually, to an extent determined by their values, these circuits operate more or less concurrently with each other to bring about their desired results, so that the differentiating circuit 187, 189 may begin to operate before the integrating capacitor 191 has become fully charged.

It should also be recognized that the use of the integrating capacitor 191 for delaying the action of the differentiating network 187, 189 is an optional, additional improvement and that, if desired, this feature may be omitted and the feedback loop may be used with the differentiating circuit 187, 189 only, without any means for delaying its action on the amplifier gain. Additionally, as pointed out earlier, the integrating response achieved in the exemplary circuit of FIG. 3 by means of a differentiating circuit 187, 189 in a negative feedback path may also be achieved by means of an integrating circuit connected serially in the input path of the differential amplifier 35. Where this modification is used, it will be clear that a simple differentiating network, connected in series with the integrating circuit, can be employed to delay the action of the integrating circuit just described.

Alternative amplifier

Figure 5:
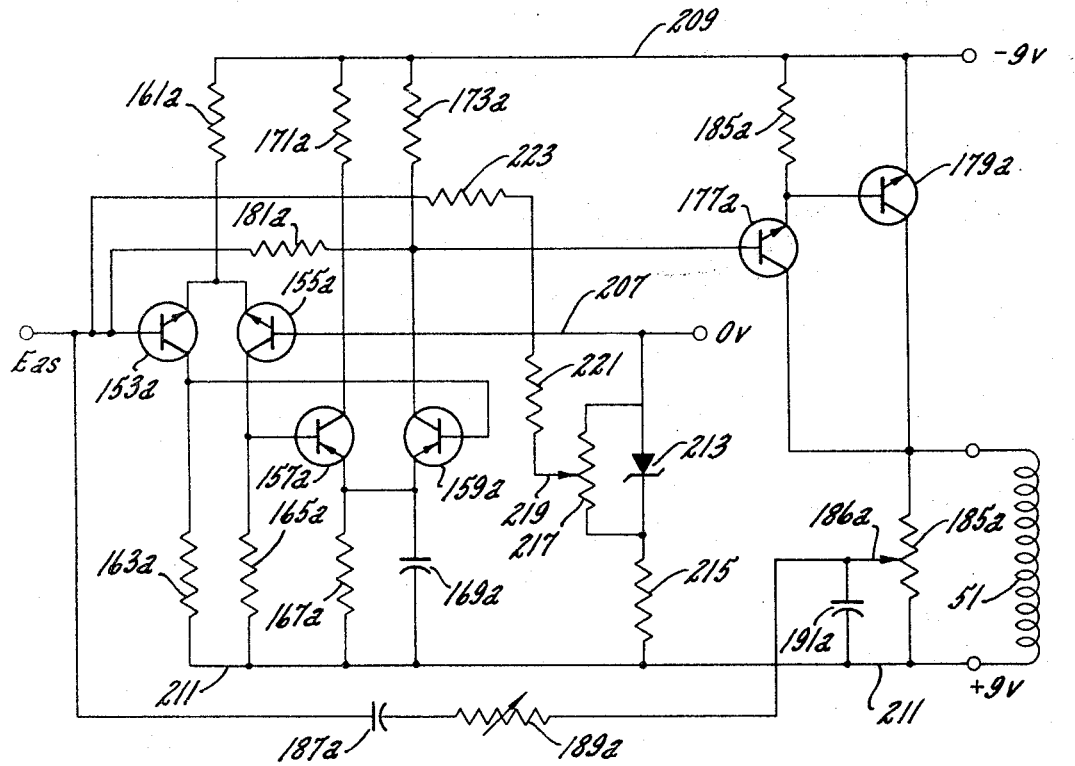
FIG. 5 is a detailed schematic diagram of a modification of a portion of the exemplary electronic control unit illustrated in FIG. 3.

FIGURE 5 shows an alternative embodiment of the amplifier 35 shown in FIG. 3. To aid in perceiving the differences between the preferred and alternative embodiments respectively shown in FIGS. 3 and 5, components of the circuit of FIG. 5 which correspond to components in the circuit of FIG. 3 will be marked with the same reference numerals having the distinguishing suffix $a$.

The alternative circuit of FIG. 5 includes a differential amplifier, a buffer-inverter stage and a feedback network organized in essentially the same manner as those previously described with reference to FIG. 3. The alternative circuit of FIG. 5 is adapted however, to operate from a power supply having a zero volt neutral line 207, a −9 volt line 209, and a +9 volt line 211. Power supplies for producing such voltages are well known to those skilled in the art and will not be described here.

The actual speed signal is applied to the base of the transistor 153a just as it was applied to its counterpart in FIG. 3. However, in contrast to the circuit of FIG. 3, the speed command signal is also applied to the base of the transistor 153a and this signal is positive rather than negative as it was in the circuit of FIG. 3. To produce the speed command signal, a Zener diode 213 is connected in series with a resistor 215 between the lines 207 and 211 and a speed command potentiometer, having a wiper 219, is connected across the Zener diode 213. The variable DC positive voltage at the potentiometer wiper 219 is applied to the base of the transistor 153a through a pair of series connected resistors 221 and 223.

Instead of receiving the speed command signal as did its counterpart in the circuit of FIG. 3, the base of transistor 155a is connected to the line 207 and is held at zero volts thereby.

Receiving both the actual speed signal and the speed command signal, the base of transistor 153 acts as a voltage signal summing junction. So long as the speed command signal and the actual speed signal are exactly equal, they cancel each other and the input to the base of the transistor 153a remains zero. Since this is also the voltage that is applied to the base of the other transistor 155a, the two transistors remain in balance and non-conducting as do the second stage transistors 157a and 159a of the differential amplifier. In the manner explained in connection with the differential amplifier of FIG. 3, this results in the collector of transistor 159a remaining at about −9 volts and the transistors 177a and 179a being cut off and drawing no current through the output potentiometer 185a.

If, on the other hand, the actual speed signal differs from the speed command signal, which is typical if there is a load on the prime mover 11, a net voltage will be impressed upon the base of transistor 153a and as a result transistors 153a and 155a will conduct in unequal amounts, as will the second stage transistors 157a and 159a. As a result, again in the manner described with respect to the differential amplifier of FIG. 3, the voltage of the collector of transistor 159a and of the base of transistor 177a will rise from −9 volts to a more positive level, causing current to be drawn by transistors 177a and 179a through the solenoid 51. The wiper 186a of the feedback potentiometer thus receives a selected fraction of the voltage which appears across the winding 51.

The integrating capacitor 191a and the differentiating capacitor 187a operate in the same manner as their counterparts in the circuit of FIG. 3 to achieve integrating and differentiating action respectively.

From the foregoing description, it will be clear that there has been brought to the art a speed governing system having the accuracy and stability heretofore approached only by systems which employ integrating actuators, but at a reduced cost made possible by the use of a relatively inexpensive proportional actuator. Such upgrading in the performance of the proportional actuator is achieved by the use of a high gain amplifier having an integrating response characteristic for optimum stability and optionally incorporating a differential response characteristic to delay the effect of the integrating response characteristic and thus to speed up the response speed of the speed governing system to large changes in required speed or load.

I claim as my invention:

1. In a system for controlling the speed of a prime mover, said system including a movably positionable control member for controlling the rate of supply of an energy medium to the prime mover and means for producing first and second variable DC signals which by their magnitudes respectively represent the desired speed and the actual speed of the prime mover, the improvement which comprises in combination an operational summing amplifier connected to receive said first and second signals, said amplifier having means for producing an output signal which is a high gain function of the difference between said first and second signals with a time integral response of one time constant to changes in said difference and a time derivative response of a shorter time constant to changes in said difference, an actuator having a movable output member coupled to position said control member, and said actuator including means connected to receive said output signal and responsive thereto for keeping said output member positioned in accordance with the magnitude of the output signal.

2. The combination set forth in claim 1, wherein said amplifier includes a time differentiator connected in a negative feedback path between an output and an input to provide said integral response, and a time integrator connected in a negative feedback path between an output and an input to provide said derivative response.

3. In a system for controlling the speed of a prime mover, said system including a movably positionable control member for controlling the rate of supply of an energy medium to the prime mover and means for producing first and second variable DC signals which by their magnitudes respectively represent the desired speed and the actual speed of the prime mover, the improvement which comprises in combination an operational summing amplifier connected to receive said first and second signals, said amplifier having means for producing an output signal which is a high gain function of the difference between said first and second signals, an actuator having a solenoid connected to receive said output signal and operative to produce a corresponding force on a movable armature, said armature being connected with a pilot valve plunger yieldably biased to a center position by resilient elements, a servo piston and fluid pressure means for moving the latter in one direction or the other when said plunger is displaced in one sense or the other from its center position, a coupling between said piston and one of said resilient elements for causing the latter to exert a force on said plunger which varies in accordance with the position of said plunger so that for each magnitude of said output signal the piston assumes a corresponding position, and means coupling said piston to said control member, whereby the control member is moved to a position which corresponds substantially to the amplified difference between said first and second signals to keep the latter substantially but not precisely equal.

4. In a system for controlling the speed of a prime mover, said system including a movably positionable control member for controlling the rate of supply of an energy medium to a prime mover and means for producing first and second variable DC signals which by their magnitudes respectively represent the desired speed and the actual speed of the prime mover, the improvement which comprises in combination an operational amplifier connected to receive said first and second signals and having means for producing an output signal which is a high gain function of the difference between such signals, said amplifier also having means for causing said output signal to vary with a time integral response of a first time constant and a time derivative response of a second, shorter time constant, an actuator having a solenoid excited with said output signal to produce a corresponding force on a movable associated armature, a plunger physically connected with said armature and yieldably biased to a center position by resilient elements, a movable output member and means for causing the latter to move in one direction or the other so long as said plunger is displaced in one sense or the other from its center position, a coupling between said output member and one of said resilient elements for exerting a force on said plunger which opposes said corresponding force and which varies according to the position of said output member, and means coupling said control member to said output member to cause the latter to adjustably position the former.

References Cited

UNITED STATES PATENTS

| | | | |
|---|---|---|---|
| 2,829,662 | 4/1958 | Carey | 137—36 |
| 3,187,223 | 6/1965 | Raeber | 317—5 |
| 3,198,985 | 8/1965 | Haskell | 317—5 |
| 3,274,443 | 9/1966 | Eggenberger | 137—30 X |
| 3,291,146 | 12/1966 | Walker | 137—30 X |
| 3,348,559 | 10/1967 | Brothman | 137—36 X |

CLARENCE R. GORDON, *Primary Examiner.*

U.S. Cl. X.R.

137—30